Patented Dec. 11, 1934

1,983,531

UNITED STATES PATENT OFFICE

1,983,531

MANUFACTURE OF SHEETS OR FILMS OF REGENERATED CELLULOSE

Jacques Edwin Brandenberger, Neuilly-sur-Seine, and Charles Victor Emmanuel Duplessis, Courbevoie, France, assignors to Du Pont Cellophane Company, Inc., New York, N. Y., a corporation of Delaware No Drawing. Application April 25, 1932, Serial No. 607,492

1 Claim. (Cl. 18—57)

This invention relates to the manufacture of sheets or films of regenerated cellulose and more particularly to the manufacture of sheets or films of regenerated cellulose having a thickness less than 0.02 mm.

One of the common procedures employed in the manufacture of sheets or films of regenerated cellulose now in use comprises extruding a cellulosic solution, such as a viscose solution directly into a coagulating bath or on a provisional support cooperatively disposed in the coagulating bath whereby the film is coagulated. The film is then regenerated and, after subjecting it to the purifying operations, is finished in the usual manner. In some methods the coagulation and regeneration of the film are effected in a single bath.

The viscose solutions commonly employed in the manufacture of sheets or films of regenerated cellulose contain 7% to 8% cellulose and possess viscosities of 15 to 35 seconds. The term "viscosity" as herein used is intended to designate the time in seconds that it will take a polished steel ball 3.7 mm. in diameter to fall 150 mm. disposed equidistant from the ends of a tube .4 m. in length and having an internal diameter of 36 mm. and filled with viscose at 20° C. In actual practice, the viscosity of the viscose solution is never permitted to exceed 35 seconds because the filtration and casting of such a viscose solution becomes extremely difficult. The desirable viscosity is secured by aging the alkali cellulose, from which the cellulose xanthate utilized in the production of the viscose solution is prepared under precise condition of time and temperature, such as 72 hours at a temperature of 23° C.

In the method just described, the solution is extruded from a device commonly termed a hopper which is provided at its lower end with oppositely disposed lips, usually adjustable, and conjointly defining a slot through which the solution is extruded. The length of the slot depends chiefly on the width of the film sought to be produced. When a product having a thickness of 0.02 mm. is desired, which is the thickness of the commercial product, the lips of the hopper are spaced from each other to provide a slot approximately 0.2 mm. in width.

No matter how perfect and precise the apparatus, particularly the lips, may be, there are always present small mechanical irregularities which are translated into noticeable differences in thickness on the commercial film of 0.02 mm. in thickness. It is, of course, obvious that the thinner the film the greater is the proportional importance of these small mechanical errors and of the differences in thickness which result therefrom. If a thinner product is desired and the slot is attempted to be made narrower as by, for example, bringing the lips of the hopper closer to each other, the differences in thickness resulting from the irregularities in the mechanical devices above explained make the product unacceptable to the trade. Moreover, the differences in thickness present an enormous hindrance to the formation of a thin and continuous film. In addition to the foregoing, the operation is made difficult because particles of hardened viscose which have not been removed become lodged in a portion of the hopper opening. Moreover, operating a casting machine with a seriously reduced flow of viscose presents problems of its own.

As apparent from the foregoing, it is practically impossible to manufacture sheets or films of regenerated cellulose less than 0.02 mm. in thickness, such as 0.015 mm., 0.010 mm. or less in thickness, under the conditions usually employed as above explained.

We have found that we can produce sheets or films of regenerated cellulose less than 0.02 mm. in thickness and use the identical apparatus and conditions employed prior to this invention by extruding from the hopper a viscose solution prepared from green alkali cellulose, i. e. alkali cellulose which has not been aged or has been only mildly or slightly aged, said solution containing not more than 4% of cellulose and having a viscosity approximately that possessed by cellulosic solutions containing 7%–8% cellulose.

It is, therefore, an object of this invention to provide sheets or films of regenerated cellulose having a thickness less than 0.02 mm. in thickness.

Another object of this invention is to provide a method of preparing sheets or films of regenerated cellulose less than 0.02 mm. in thickness.

Another object of this invention is to provide a method of producing sheets or films of regenerated cellulose less than 0.02 mm. in thickness, wherein the same apparatus employed in the procedures prior to this invention may be utilized.

A further object of this invention is to provide a viscose solution suitable for use in the production of sheets or films of regenerated cellulose less than 0.02 mm. in thickness.

In accordance with the principles of this invention, a viscose solution is prepared by xanthating green alkali cellulose and then dissolving the cellulose xanthate in an aqueous solution of caustic alkali to form a viscose solution containing not more than 4% cellulose. By virtue of the fact that green alkali cellulose has been employed in the production of the viscose solution, the latter possesses a viscosity of from 15 to 35 seconds which is substantially the same as that possessed by a normal viscose solution containing 7%-8% cellulose and prepared from aged alkali cellulose.

By decreasing the proportion of the weight of caustic soda calculated as NaOH to the weight of cellulose normally used in the production of viscose and which is approximately 1, it is found that a supplemental increase in the viscosity of the viscose may be secured, thus aiding and facilitating the casting of a viscose solution relatively poor in cellulose. With this in view, the viscose solution of the instant invention is prepared so that in addition to the previously mentioned characteristics, the ratio of the weight of caustic soda calculated as NaOH to the weight of cellulose is less than 1 and preferably between 0.7-0.8.

In the manufacture of the viscose solution above explained, it has been found advantageous to use cellulosic material which is only slowly degraded during the course of the production of the solution. Linters or specially prepared cellulose may also be utilized for the purpose of obtaining dilute viscose solutions of high viscosities.

A viscose solution prepared as above described and characterized by the features set forth may be cast in the identical apparatus employed prior to this invention for the purpose of making sheets or films of regenerated cellulose.

According to the invention, the slot of the hopper may be of the same width used heretofore in the production of sheets or films of regenerated cellulose having thicknesses of at least 0.02 mm. In other words, when a viscose solution of the type hereinbefore described is cast under conditions which normally would result in a film at least 0.02 mm. in thickness, such as 0.025 mm., when the prior art method and viscoses were utilized, there results a film which is less than 0.02 mm. in thickness, such as 0.015 mm., 0.012 mm., 0.01 mm. or even less.

The operations and sequence thereof utilized in the manufacture of sheets or films of regenerated cellulose are substantially the same as those employed prior to this invention.

Since it is obvious that various changes may be made in the above description without departing from the nature and spirit thereof, this invention is not restricted thereto except as set forth in the appended claim.

We claim:

In a continuous method of preparing purified sheets or films of regenerated cellulose less than 0.02 mm. in thickness, the step which comprises extruding a viscose solution prepared from green alkali cellulose and containing 4% cellulose and having a viscosity of 15 to 35 seconds through a slot in which the lips are spaced to permit the production of films having a thickness of at least 0.02 mm. when a viscose solution containing 7% to 8% cellulose is extruded therefrom into a coagulating bath, regenerating the film and purifying said film.

JACQUES EDWIN BRANDENBERGER.
CHARLES VICTOR EMMANUEL DUPLESSIS.